Patented Sept. 14, 1948

2,449,364

UNITED STATES PATENT OFFICE 2,449,364

PROCESS FOR ISOLATING VANILLIN

André Blankart, Basel, Switzerland, assignor to Hoffmann-La Roche Inc., Nutley, N. J., a corporation of New Jersey No Drawing. Application August 6, 1946, Serial No. 688,693. In Switzerland October 15, 1945

5 Claims. (Cl. 260—600)

The present invention relates to the isolation of vanillin.

Vanillin is comparatively easily soluble in water. During its preparation and purification, therefore, substantial quantities always remain in the aqueous solutions. They were hitherto recovered by treatment with organic solvents. Thereby losses of these auxiliary agents could not be avoided. These losses were the higher, the smaller the vanillin content in the initial solution. This was found disadvantageous, particularly during the tests aiming at isolating vanillin from sulphite waste-liquors.

In accordance with the present invention, vanillin can now be isolated from its aqueous solutions, without having to fear losses in solvents, by adsorbing it on to an adsorption agent which is an anion exchange resin and eluting it therefrom by means of suitable solvents. During the adsorption the solution should have a pH of between 5 and 9. Thus, only vanillin is adsorbed and, on elution, it accrues separately, free from accompanying substances.

"Wofatite M" which is an anion exchange resin from m-phenylenediamine and formaldehyde is above all suitable as the adsorption agent. This is a fine-grained, brown-black, resinous material, the employment of which for adsoption purposes is well known as such (cf. "Die Installation," No. 1, April 1942; "Schweizer Brauerei-Rundschau," No. 9, 1943). The process for preparing this type of anion exchange resin is described in U. S. Patent No. 2,106,486, granted January 25, 1938.

The elution of the vanillin from the adsorption agent can be effected with dilute acid or with alkalis; with the latter higher concentrations are obtainable. It is of advantage to enrich the adsorption medium as far as possible with the vanillin in order that it may be obtained in concentrated solution on elution. In order definitely to avoid losses which could result from the adsorbent being passed by the vanillin solution, it is of advantage to apply the counter-current method.

The vanillin can be isolated from the elution solutions by extraction with an organic solvent. Since a considerably smaller volume has to be extracted the losses of solvents are insignificant. The vanillin can also be precipitated from the elution solution in solid form and the remaining mother liquor can again be conducted through the adsorbent material.

By working the process of the present invention, the use of organic solvents can be completely avoided.

Example 1

1 part by weight of dark mother liquors and wash waters resulting from vanillin purification, containing 0.20 per cent. of vanillin, is adjusted to pH 7 and allowed to flow slowly through a glass cylinder having a diameter of 4 cms. and charged with 0.1 part by weight of "Wofatite M." The solution runs off completely free from vanillin.

The "Wofatite" layer is now eluted with 0.2 part by weight of dilute sulphuric acid and washed with 0.11 part by weight of water. The aqueous solution is repeatedly shaken with benzene. The resulting solution is evaporated. The vanillin remains behind as an oil which soon crystallises.

Example 2

From 4 parts by weight of dilute sulphite waste-liquor with a vanillin content of 0.06 per cent., the humic acids are precipitated at acid reaction. After filtration the solution is adjusted to pH 7, allowed to pass through 0.1 part by weight of "Wofatite M," which is contained in a glass cylinder, and washed with 0.2 part by weight of water. The "Wofatite" layer is eluted with 0.1 part by weight of 2N.NaOH. The solution flown off is slightly acidified. After some time the vanillin precipitates in the form of fine crystals which still show a yellow colouring. They are filtered by suction, dried and purified by distillation. The mother liquors and the wash waters are adjusted to pH 7 and again conducted to the adsorption agent.

Example 3

6000 parts by weight of a vanillin solution with a content of 0.7 per cent. are adjusted to pH 7.5 without precipitating the humic acids and allowed to flow through three glass cylinders which are connected in series and which are each charged with 50 parts by weight of "Wofatite M." Finally, washing with 300 parts by weight of water is effected. On elution with 2N.KOH, 3.07 parts by weight of vanillin are obtained from the first 50 parts by weight of "Wofatite." 2.1 parts by weight of vanillin can be precipitated in crystalline form therefrom; the rest remains in the mother liquor. The second "Wofatite" cylinder contains 1.12 parts by weight of vanillin, whereas no appreciable quantity of this substance can be isolated from the third cylinder. The adsorption of vanillin is now proceeded with by employing the second "Wofatite" cylinder in the first position and so on.

I claim:

1. A process for isolating vanillin from its aqueous solutions, comprising adsorbing it at a pH of between 5 and 9 on to an adsorption agent which is an anion exchange resin from m-phenylenediamine and formaldehyde and eluting it therefrom by means of solvents.

2. A process for isolating vanillin from its aqueous solutions, comprising adsorbing it, by applying the counter-current method, at a pH of between 5 and 9 on to an adsorption agent which is an anion exchange resin from m-phenylenediamine and formaldehyde and eluting it therefrom by means of solvents.

3. A process for isolating vanillin from its aqueous solutions, comprising adsorbing it at a pH of between 5 and 9 on to an adsorption agent which is an anion exchange resin from m-phenylenediamine and formaldehyde and eluting it therefrom by means of solvents, the counter-current method being applied for the adsorption and the elution.

4. A process for isolating vanillin from its aqueous solutions, comprising adsorbing it at a pH of between 5 and 9 on to an adsorption agent which is an anion exchange resin from m-phenylenediamine and formaldehyde, eluting it therefrom by means of solvents and keeping the elution solution concentrated to such an extent that, on neutralisation, the vanillin precipitates in solid form, and again subjecting to adsorption the mother liquor separated from the crystals.

5. A process for isolating vanillin from its aqueous solutions, comprising adsorbing it at a pH of between 5 and 9 on to an adsorption agent which is an anion exchange resin from m-phenylenediamine and formaldehyde and eluting it therefrom with caustic alkalis.

ANDRÉ BLANKART.

REFERENCES CITED

The following references are of record in the file of this patent:

Philip J. Elving et al., "Synthetic Resins and Base Exchange Phenomena," Proceedings of Indiana Academy of Science for 1941, pages 136–145.

W. Lautsch, Die Chemie, vol. 5, pages 149–154 (1944).